(12) United States Patent
Naito et al.

(10) Patent No.: US 8,488,140 B2
(45) Date of Patent: Jul. 16, 2013

(54) IMAGE FORMING APPARATUS AND PROCESSING METHOD FOR THE SAME

(75) Inventors: Yoshiko Naito, Kawasaki (JP); Yumiko Iwata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1028 days.

(21) Appl. No.: 12/348,848

(22) Filed: Jan. 5, 2009

(65) Prior Publication Data

US 2009/0195815 A1    Aug. 6, 2009

(30) Foreign Application Priority Data

Jan. 31, 2008    (JP) ................................. 2008-021650

(51) Int. Cl.
*G06F 15/00* (2006.01)
*G06K 1/00* (2006.01)

(52) U.S. Cl.
USPC ............ 358/1.14; 358/1.1; 358/1.9; 358/1.16

(58) Field of Classification Search
None
See application file for complete search history.

(56) References Cited

U.S. PATENT DOCUMENTS

2005/0286078 A1*  12/2005  Maruyama ................... 358/1.15
2006/0007469 A1    1/2006  Uruma
2006/0028661 A1*  2/2006  Uruma ........................... 358/1.6
2008/0094658 A1*  4/2008  Teranoshita ................. 358/1.15

FOREIGN PATENT DOCUMENTS

JP    2006-021501    1/2006
JP    2006-268117    10/2006

* cited by examiner

*Primary Examiner* — Thierry Pham
(74) *Attorney, Agent, or Firm* — Fitzpatrick, Cella, Harper & Scinto

(57) ABSTRACT

When an instruction to shut down an image forming apparatus is provided, a list of tasks is generated and displayed based on the characteristics and operation state of each task. If an instruction to cancel a displayed running task is provided, processing of the task is canceled and shutdown processing is performed. Thus, user convenience can be improved by displaying whether or not the running tasks are cancelable when an instruction to shut down the image forming apparatus is provided.

5 Claims, 19 Drawing Sheets

FIG. 14

| TASK TYPE | PROCESSING STATE | CANCEL | SETTING CHANGE POSSIBILITY | SETTING CHANGE METHOD |
|---|---|---|---|---|
| PRINT JOB | WAITING | PERMITTED | POSSIBLE | SAVE IN BOX |
| PRINT JOB | ONGOING | PERMITTED | POSSIBLE | SAVE IN BOX |
| FAX TRANSMISSION AT SPECIFIED TIME | WAITING | PERMITTED | POSSIBLE | CHANGE TIME |
| FAX TRANSMISSION | WAITING | PERMITTED | IMPOSSIBLE | |
| FAX TRANSMISSION | ONGOING | PERMITTED | POSSIBLE | SAVE IN BOX |
| FAX RECEIVE | WAITING | PERMITTED | IMPOSSIBLE | |
| FAX RECEIVE | ONGOING | PROHIBITED | IMPOSSIBLE | |
| FIRMWARE UPDATE | OBTAINING UPDATE IMAGE | PERMITTED | IMPOSSIBLE | |
| FIRMWARE UPDATE | DECOMPRESSING UPDATE IMAGE | PERMITTED | IMPOSSIBLE | |
| FIRMWARE UPDATE | REPLACING FIRMWARE | PROHIBITED | IMPOSSIBLE | |
| MONITORING | TRANSMITTING ERROR INFORMATION | PERMITTED | IMPOSSIBLE | |
| MONITORING | OBTAINING PERIODICALLY TRANSMITTED INFORMATION | UNNECESSARY | IMPOSSIBLE | |
| MONITORING | TRANSMITTING PERIODICALLY TRANSMITTED INFORMATION | UNNECESSARY | IMPOSSIBLE | |
| DEVICE LINK | LINKED | UNNECESSARY | IMPOSSIBLE | |

FIG. 15

| TASK TYPE | TASK NUMBER | PROCESSING STATE | ACCOMPANYING STATE |
|---|---|---|---|
| PRINT JOB | 1 | ONGOING | USER NAME = USER 1 |
| PRINT JOB | 4 | WAITING | USER NAME = USER 4 |
| FAX TRANSMISSION AT SPECIFIED TIME | 3 | WAITING | 2007/11/30/ 13:10 |
| FAX TRANSMISSION | 5 | BEING TRANSMITTED | USER NAME = USER 3 |
| FIRMWARE UPDATE | 6 | UPDATING FIRMWARE | REMAINING TIME = 15 MINUTES |
| MONITORING | 10 | TRANSMITTING PERIODICALLY TRANSMITTED INFORMATION | REMAINING TIME = 0 MINUTES |
| DEVICE LINK | — | LINKED | LINK SOURCE = iRC4580 |

FIG. 18

DESTINATION BOX DESIGNATION

SELECT A BOX FOR SAVING THE JOB.

COMMON ▼ ~1801

1802 — OK    CANCEL — 1803

FIG. 19

TIME SETTING CHANGE

CURRENT SET TIME : 2007/11/30 13:10 ~1901

NEW SET TIME : ~1902

1903 — OK    CANCEL — 1904

IMAGE FORMING APPARATUS AND PROCESSING METHOD FOR THE SAME

BACKGROUND OF THE INVENTION

1. Field of the Invention

The present invention relates to image forming apparatuses and processing methods for the same.

2. Description of the Related Art

In an image forming apparatus, when an instruction to shut down the apparatus is provided while jobs input by a user of the apparatus are being processed or waiting to be processed, the user needs to be notified thereof.

Japanese Patent Laid-Open No. 2006-21501 discloses displaying information about ongoing and waiting jobs upon a shutdown instruction and receiving a determination whether or not to perform shutdown.

Japanese Patent Laid-Open No. 2006-268117 discloses determining upon a shutdown instruction whether or not jobs are remaining in a spool where jobs to be processed are stored, and if it is determined that unprocessed jobs are remaining, displaying a list of the unprocessed jobs and receiving a user's selection to print or delete the jobs.

However, processing performed in an image forming apparatus is not limited to printing user-input jobs. An example of other kinds of processing performed is processing of updating firmware of the image forming apparatus itself.

The firmware update processing is roughly divided into two processing parts. The first processing part is downloading the firmware from a server and saving the downloaded firmware in a temporary work area.

The next processing part is transferring the firmware saved in the work area to an existing firmware storage area.

If an instruction to shut down the image forming apparatus is provided during the latter part of the above-described processing, this will result in that the image forming apparatus does not start at the next power-on because the firmware remains incomplete.

To shut down the image forming apparatus without compromising functions of the apparatus such as the firmware update processing, it is not sufficient only to check user-input jobs.

In an office environment, jobs are input to a single networked image forming apparatus from a plurality of personal computers (PCs) that are also networked. In such an environment, a user who provides a shutdown instruction and a user who has input a job are often different.

Controlling execution of a job by a user different from a user who has input the job may cause a mistaken recognition that a printed matter has become lost. Therefore, a user with administrative authority needs to take responsibility for this control.

Further, job control methods that include only continuing print and deleting are not sufficient in the following points.

(1) If continuing print is selected, it takes long before shutdown when there are many jobs waiting to be printed.

(2) If deleting is selected, the print jobs need to be input again later.

SUMMARY OF THE INVENTION

An object of the present invention is to determine whether or not running tasks are cancelable when an instruction to shut down an image forming apparatus is provided.

A further object of the present invention is to appropriately present cancelable tasks and non-cancelable tasks to a user.

According to an aspect of the present invention, there is provided an image forming apparatus comprising: a display unit that, when an instruction to shut down the image forming apparatus is provided, distinguishably displays cancelable tasks and non-cancelable tasks executed in the image forming apparatus based on a type and a processing state of each task; and a processing unit that, when an instruction to cancel a task displayed by the display unit is provided, cancels processing of the task and performs processing for the shutdown.

According to another aspect of the present invention, there is provided a processing method for an image forming apparatus, comprising: when an instruction to shut down the image forming apparatus is provided, distinguishably displaying cancelable tasks and non-cancelable tasks executed in the image forming apparatus based on a type and a processing state of each task; and when an instruction to cancel a displayed task is provided, canceling processing of the task and performing processing for the shutdown.

Further features of the present invention will become apparent from the following description of exemplary embodiments with reference to the attached drawings.

BRIEF DESCRIPTION OF THE DRAWINGS

FIG. 14 is a diagram showing an exemplary configuration of a table that maintains data representing characteristics of tasks;

FIG. 15 is a diagram showing a task state management table that a task management program 1005 maintains in a RAM 610;

FIG. 18 is a diagram showing an exemplary destination BOX designation dialog box;

FIG. 19 is a diagram showing an exemplary time setting changing dialog box; and

DETAILED DESCRIPTION OF THE EMBODIMENTS

The best mode for implementing the present invention will be described in detail below with reference to the drawings.

Figure 1:
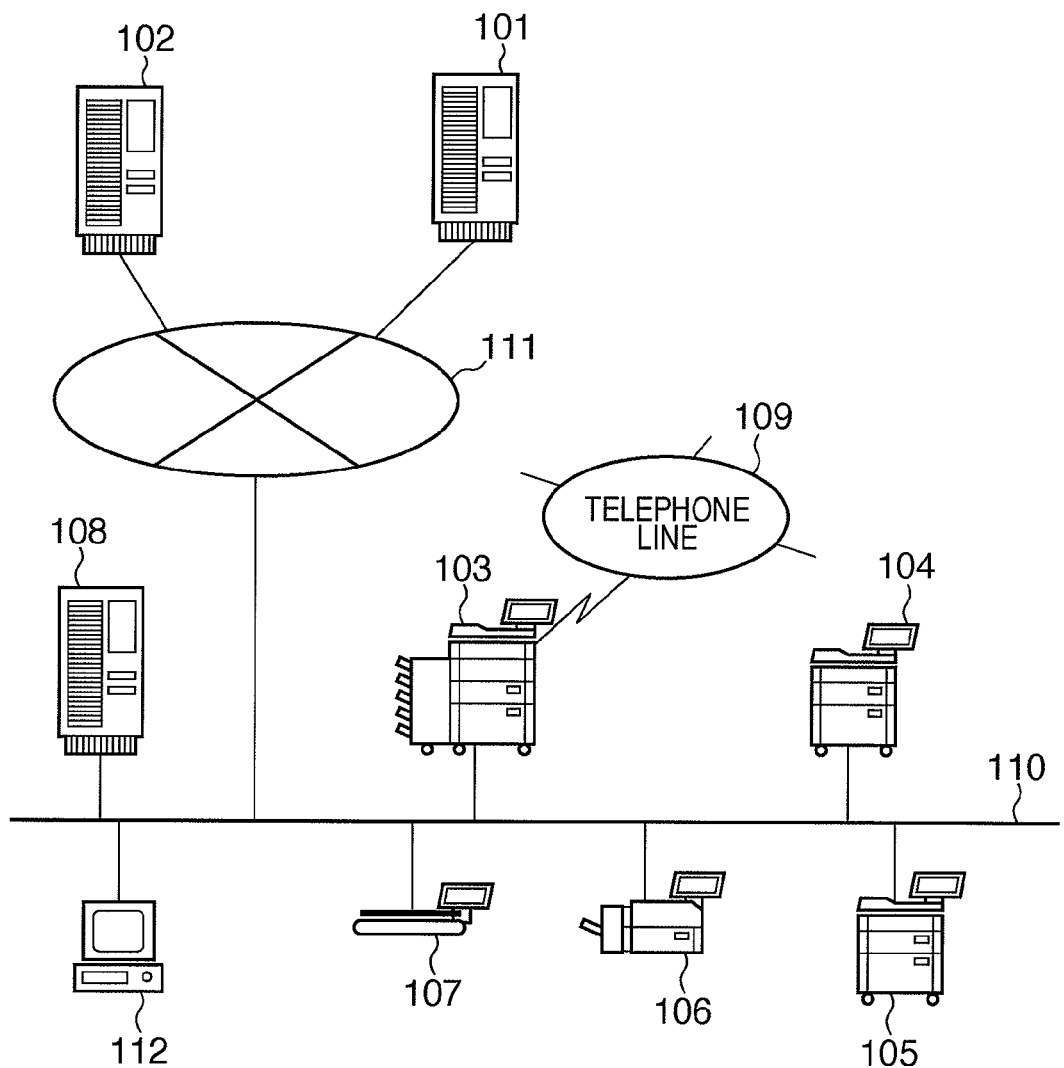
FIG. 1 is a diagram showing an exemplary configuration of an image forming system in an embodiment.

FIG. 1 is a diagram showing an exemplary configuration of an image forming system in an embodiment. In FIG. 1, reference numeral 101 denotes a firmware distribution server responsible for maintaining and distributing firmware of image forming apparatuses. Reference numeral 102 denotes a remote monitoring server that receives and monitors counter information and error information from the image forming apparatuses. The firmware distribution server 101 and the remote monitoring server 102 are connected to the Internet 111.

Reference numerals 103 to 107 denote the image forming apparatuses in which a shutdown method in this embodiment is performed. Reference numeral 103 denotes an image forming apparatus with a plurality of functions (copy, print, scan, and facsimile) integrated therein, so that it is a central multifunction peripheral playing multiple roles. In this example, the central multifunction peripheral 103 consists of a color scanner and a monochrome fast copier, and is connected to a telephone line 109 to be capable of fax transmission and reception. Reference numeral 104 denotes a color multifunction peripheral with color copy, print, and color scanner functions.

Reference numeral 105 denotes a monochrome multifunction peripheral with monochrome copy, print, and monochrome scanner functions. Reference numeral 106 denotes a color printer that receives data from an information processing apparatus such as a personal computer (PC) and performs color print. Reference numeral 107 denotes a color scanner that optically reads a color document and outputs color image data. Reference numeral 108 denotes a management server that manages the image forming apparatuses. Reference numeral 112 denotes a client PC that functions as an information processing apparatus.

The above-described management server 108, image forming apparatuses 103 to 107, and client PC 112 are configured to connect to an intranet (LAN) 110 so that they are capable of data transmission and reception (only one of which may be possible in some cases) with each other.

The client PC 112 transmits image data for printing and receives scanned image data to and from the central multifunction peripheral 103, the color multifunction peripheral 104, the monochrome multifunction peripheral 105, the color printer 106, and the color scanner 107, directly or via the management server 108.

Although in this example the management server 108 is connected to the LAN 110 to which the image forming apparatuses 103 to 107 and the client PC 112 are also connected, this is not a limitation. Rather, the management server 108 may reside in another network connected to the LAN 110 over the Internet 111.

Now, components (hardware configuration) of each server and each image forming apparatus connected to the Internet 111 and the LAN 110 will be described.

Figure 2:
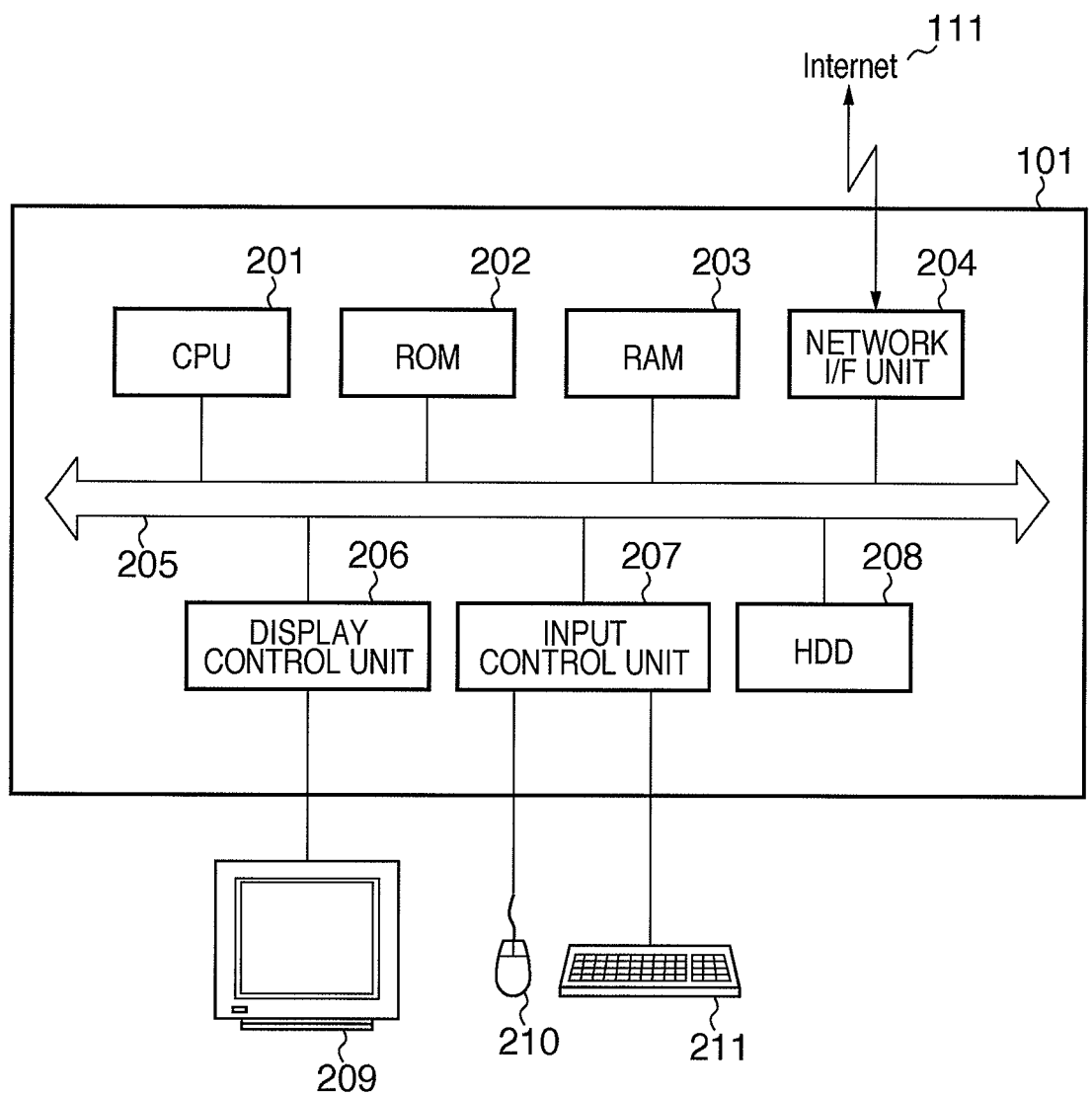
FIG. 2 is a diagram showing an exemplary hardware configuration of a firmware distribution server 101 shown in FIG. 1.

FIG. 2 is a diagram showing an exemplary hardware configuration of the firmware distribution server 101 shown in FIG. 1. A CPU 201 is for controlling the entire firmware distribution server 101. A ROM 202 is read-only memory for storing a boot program necessary for startup and programs executed in the firmware distribution server. A RAM 203 is work memory required for the CPU 201 in executing programs. A network I/F unit 204 is for communicating with the management server 108 residing at the hub, the remote monitoring server 102, and the image forming apparatuses 103 to 107 over the Internet 111.

A display control unit 206 has a display device such as a liquid crystal display 209 connected thereto. An input control unit 207 has input devices such as a mouse 210 and a keyboard 211 connected thereto. Through these input/output devices 209 to 211, an operator who manages the firmware distribution server 101 checks the operation state of the firmware distribution server 101 and provides operation instructions. An HDD 208 stores programs executed by the CPU 201, application information, and so on. In this configuration, the components 201 to 204 and 206 to 208 are connected to a system bus 205.

Figure 3:
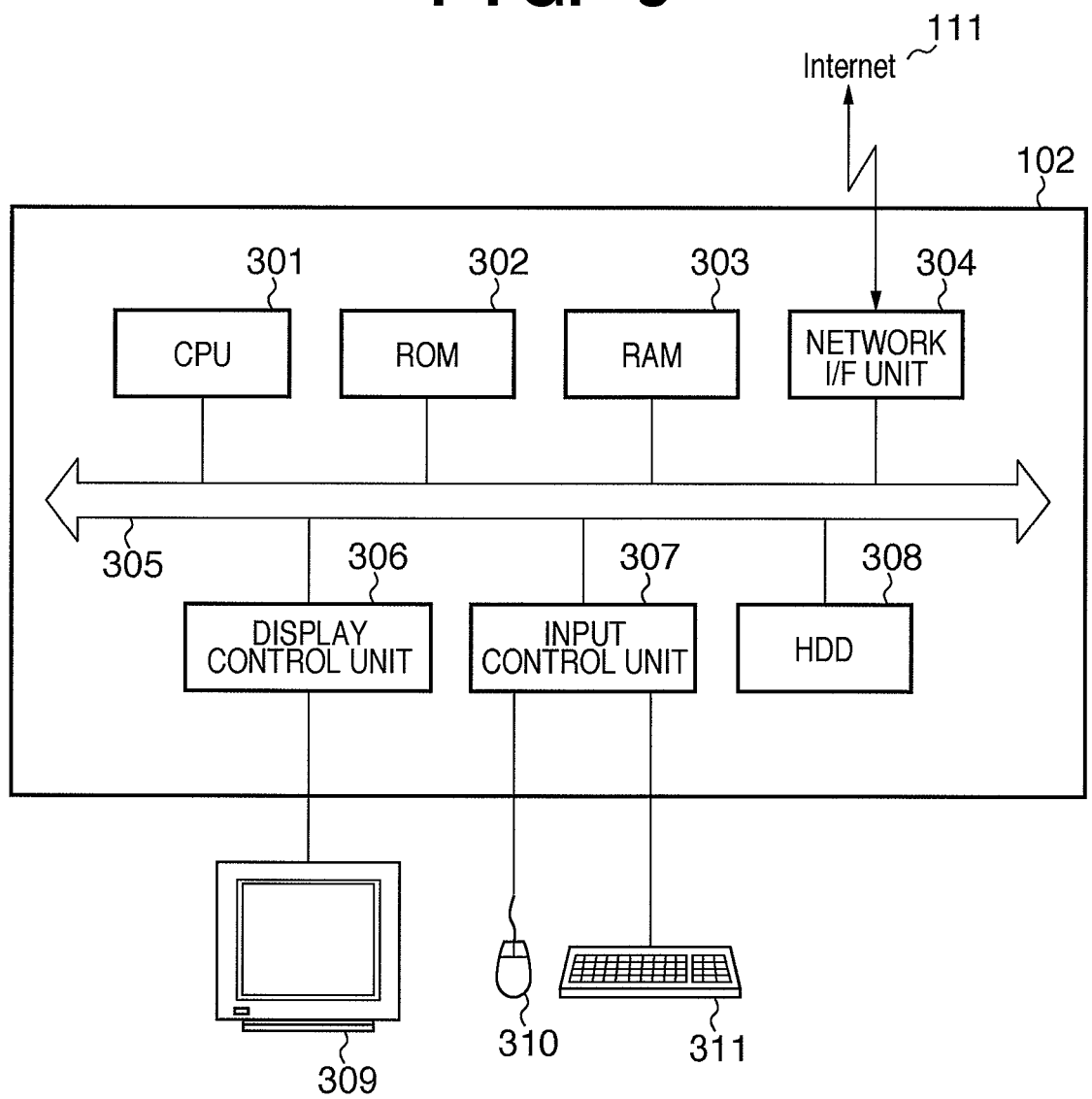
FIG. 3 is a diagram showing an exemplary hardware configuration of a remote monitoring server 102 shown in FIG. 1.

FIG. 3 is a diagram showing an exemplary hardware configuration of the remote monitoring server 102 shown in FIG. 1. Components 301 to 308 shown in FIG. 3 function in the same manner as the components 201 to 208 of the firmware distribution server 101 shown in FIG. 2 respectively, and therefore they will not be described.

Here, the hardware configuration shown in FIG. 3 functions as the remote monitoring server 102.

Figure 4:
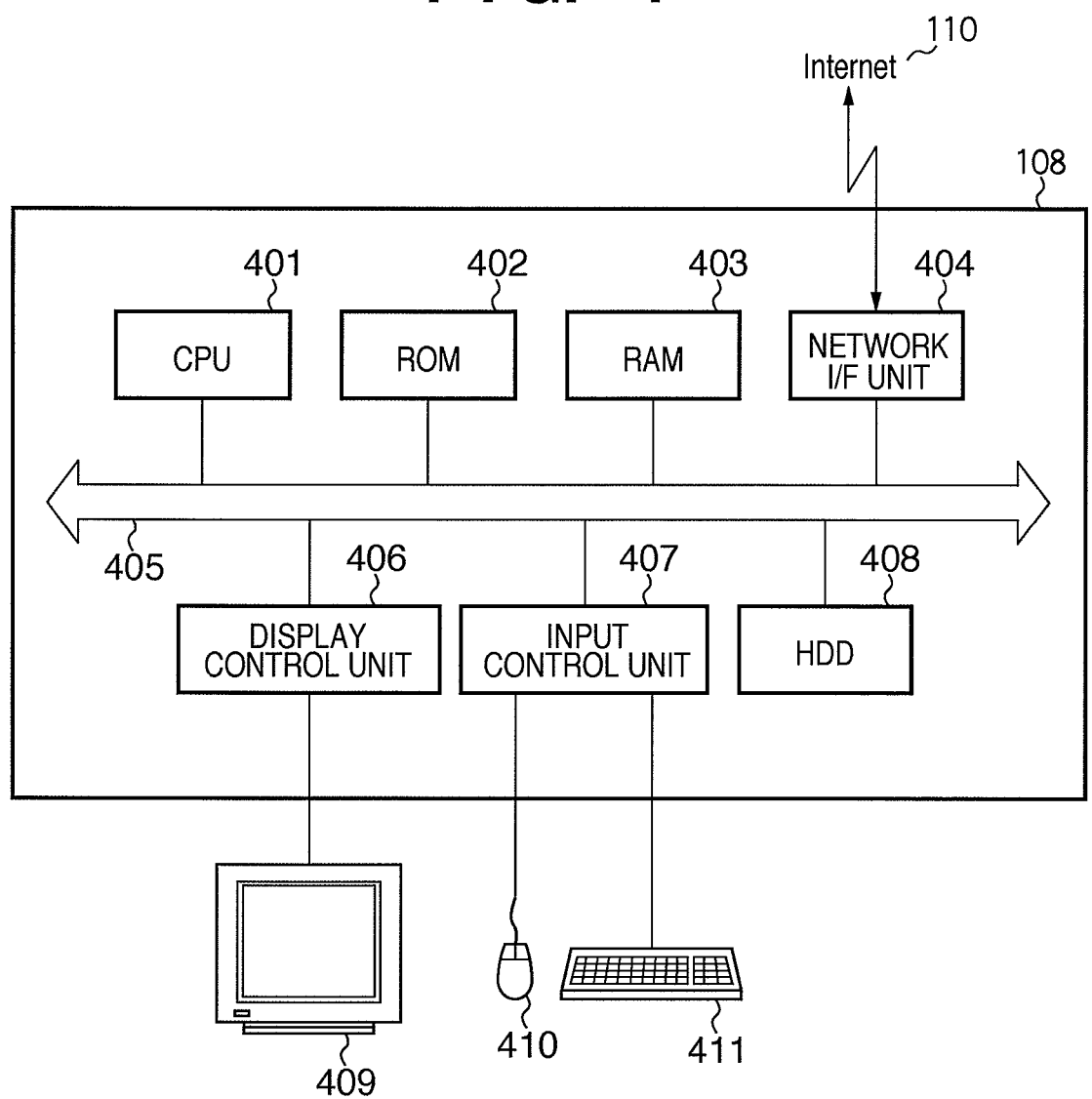
FIG. 4 is a diagram showing an exemplary hardware configuration of a management server 108 shown in FIG. 1.

FIG. 4 is a diagram showing an exemplary hardware configuration of the management server 108 shown in FIG. 1. Components 401 to 408 shown in FIG. 4 function in the same manner as the components 201 to 208 of the firmware distribution server 101 shown in FIG. 2 respectively, except that a network I/F unit 404 is connected to the intranet (LAN) 110, and therefore they will not be described.

Here, the hardware configuration shown in FIG. 4 functions as the management server 108.

Figure 5:
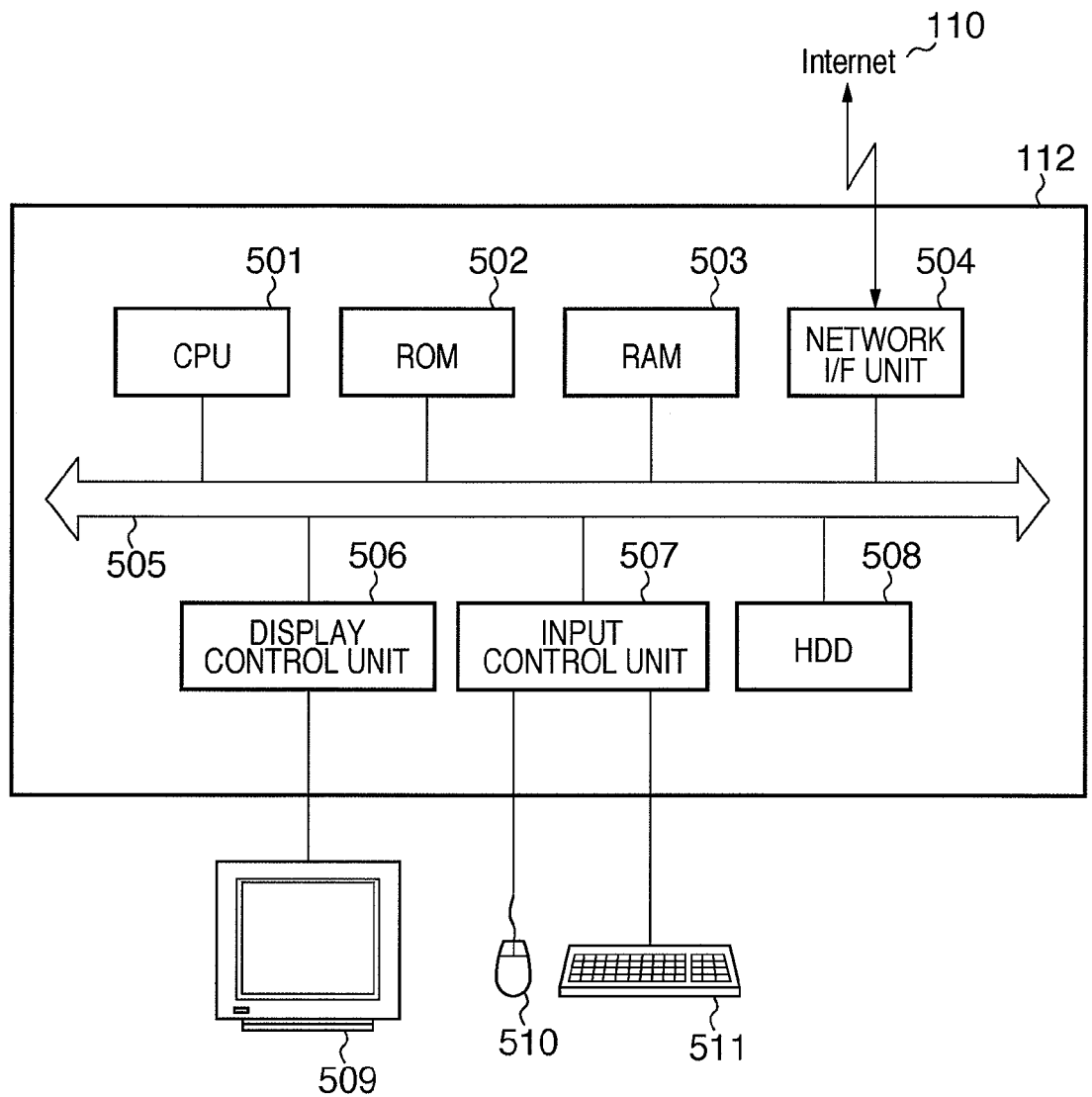
FIG. 5 is a diagram showing an exemplary hardware configuration of a client PC 112 shown in FIG. 1.

FIG. 5 is a diagram showing an exemplary hardware configuration of the client PC 112 shown in FIG. 1. Components 501 to 508 shown in FIG. 5 function in the same manner as the components 401 to 408 of the management server 108 shown in FIG. 4 respectively, and therefore they will not be described.

Here, the hardware configuration shown in FIG. 5 functions as the client PC 112.

Figure 6:
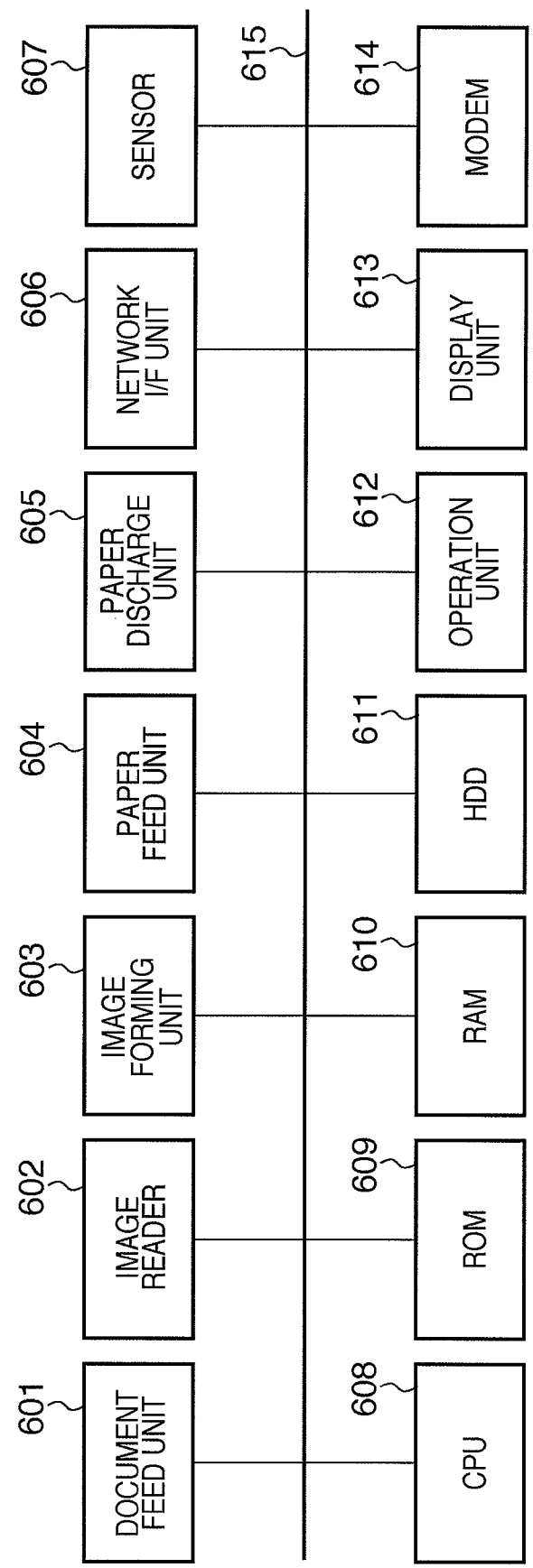
FIG. 6 is a diagram showing an exemplary hardware configuration of a central multifunction peripheral 103 shown in FIG. 1.

FIG. 6 is a diagram showing an exemplary hardware configuration of the central multifunction peripheral 103 shown in FIG. 1. The central multifunction peripheral 103 is composed of components 601 to 615. A document feed unit 601 automatically feeds a document to be read to an image reader 602. The image reader 602 is a scanner that reads a fed document. An image forming unit 603 converts a read document or received data into a print image and prints the image.

A paper feed unit 604 feeds printing paper to the image forming unit 603. A paper discharge unit 605 ejects paper printed by the image forming unit 603 and performs post-processing such as sorting and stapling. A network I/F unit 606 connects to the Internet 111 via the network (LAN) 110 and exchanges information with the outside. A sensor 607 detects the state of each part of the apparatus.

A CPU 608 performs processing on the apparatus. A ROM 609 is non-rewritable memory that stores programs and data related to the processing of the apparatus. A RAM 610 is memory that can electrically store and rewrite temporary data related to the processing of the apparatus. An HDD 611 is readable and writable mass memory that stores programs, data, and temporary data related to the processing of the apparatus, user data transmitted to the apparatus, and so on.

An operation unit 612 accepts instruction inputs to the apparatus. A display unit 613 displays the operation state of the apparatus and information related to operations performed on the operation unit 612. A modem 614 connects to the telephone line 109 shown in FIG. 1. A system bus 615 connects the components 601 to 614 with each other to exchange data.

In the central multifunction peripheral 103 in the configuration shown in FIG. 6, the image reader 602 supports color data and the image forming unit 603 processes it as monochrome data. The HDD 611 stores a program for converting print data into the PDF format. Further, a function of storing files created by the PDF-formatting program in a hierarchical structure in the HDD 611 (BOX storage function) is provided.

The color multifunction peripheral 104 shown in FIG. 1 has a configuration such that the modem 614 is removed from the configuration shown in FIG. 6. The image reader 602 and the image forming unit 603 support color data.

The monochrome multifunction peripheral 105 shown in FIG. 1 has a configuration such that the modem 614 is removed from the configuration shown in FIG. 6. The image reader 602 and the image forming unit 603 support only monochrome data.

The color printer 106 shown in FIG. 1 has a configuration such that the document feed unit 601, the image reader 602, and the modem 614 are removed from the configuration shown in FIG. 6. The image reader 602 and the image forming unit 603 support color data.

The color scanner 107 has a configuration such that the document feed unit 601, the paper feed unit 604, the paper discharge unit 605, the HDD 611, and the modem 614 are removed from the configuration shown in FIG. 6. The image reader 602 and the image forming unit 603 support color data.

Now, description will be given of the operation of linking the functions of the central multifunction peripheral 103, the color multifunction peripheral 104, the monochrome multifunction peripheral 105, the color printer 106, and the color scanner 107 to perform one process in the environment shown in FIG. 1. Such linked image forming apparatuses represented as a single image forming apparatus will be referred to as a "virtual device."

Here, the operation of this virtual device will be briefly described by taking an example of fax transmission. The color multifunction peripheral 104 and the central multifunction peripheral 103 are linked to cooperate. In this case, the color multifunction peripheral 104 is a link source, and the central multifunction peripheral 103 is a link target.

The color multifunction peripheral 104 transmits scanned color image data to the central multifunction peripheral 103, which then facsimiles the data via the telephone line 109. Image forming apparatus information about the link source and the link target forming the virtual device is maintained by the management server 108 or by each image forming apparatus.

Figure 7:
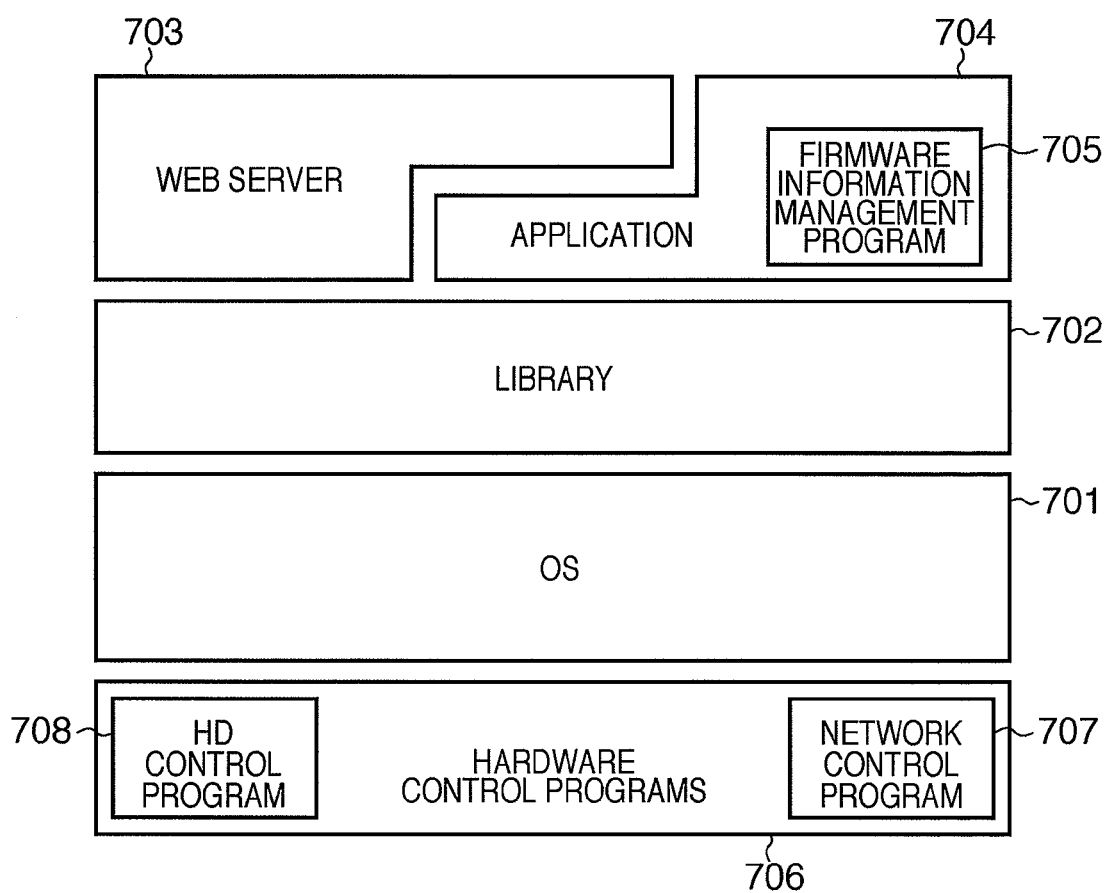
FIG. 7 is a diagram showing an exemplary software configuration of the firmware distribution server 101.

Now, the software configuration of each of the above-described servers will be described. FIG. 7 is a diagram showing an exemplary software configuration of the firmware distribution server 101.

In FIG. 7, reference numeral 701 denotes an OS (operating system), reference numeral 702 denotes a library, reference numeral 703 denotes a web server, and reference numeral 704 denotes an application. Reference numeral 705 denotes a firmware information management program that manages firmware itself and information about the firmware, and it is included in the application 704. Reference numeral 706 denotes hardware control programs. Reference numeral 707 denotes a network control program, which is included in the hardware control programs 706. Reference numeral 708 denotes a hard disk (HD) control program, which is included in the hardware control programs 706.

Figure 8:
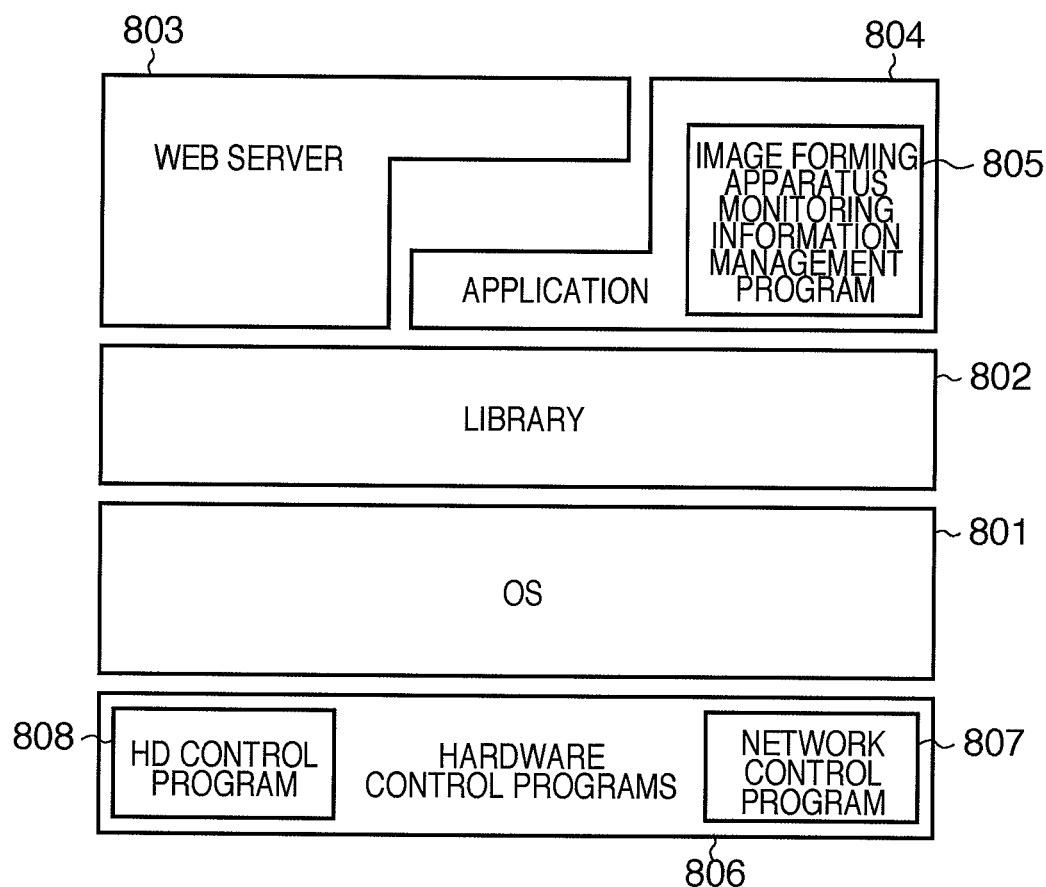
FIG. 8 is a diagram showing an exemplary software configuration of the remote monitoring server 102.

FIG. 8 is a diagram showing an exemplary software configuration of the remote monitoring server 102. Software components 801 to 808 shown in FIG. 8, except an image forming apparatus monitoring information management program 805, are basically the same as the software components of the firmware distribution server 101 shown in FIG. 7 respectively, and therefore they will not be described.

Here, the image forming apparatus monitoring information management program 805 is software for managing information about monitored image forming apparatuses and various kinds of information provided from the monitored image forming apparatuses.

Figure 9:
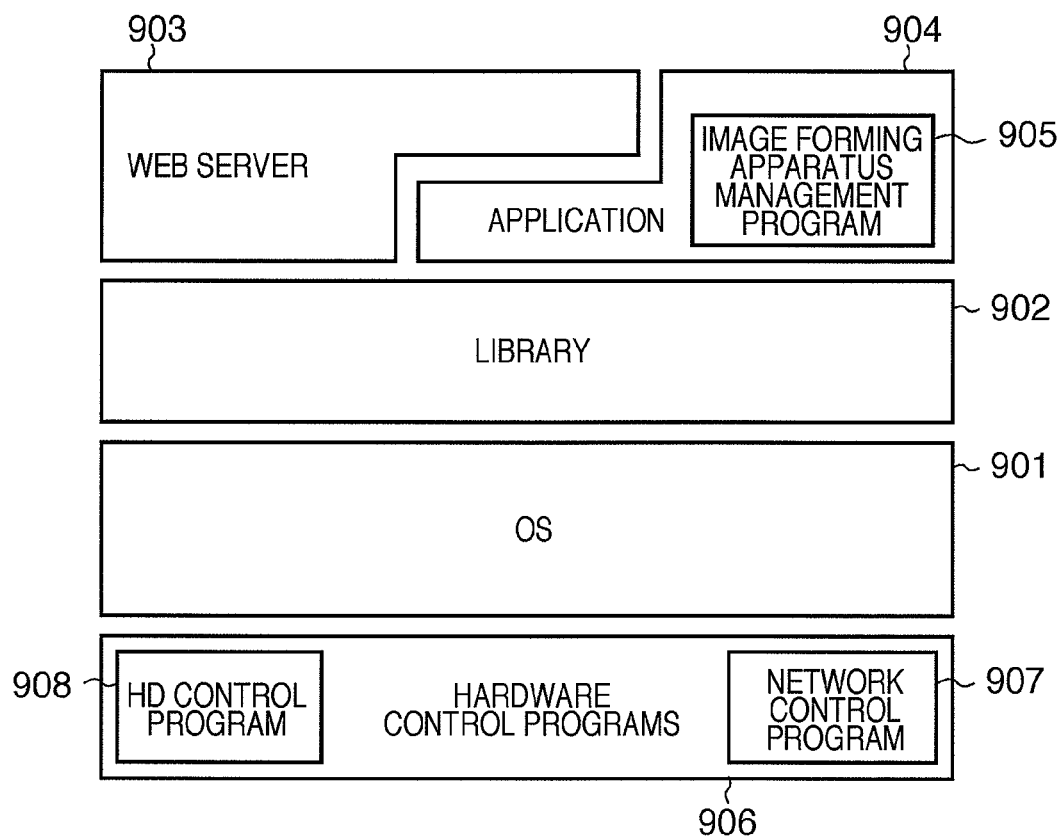
FIG. 9 is a diagram showing an exemplary software configuration of the management server 108.

FIG. 9 is a diagram showing an exemplary software configuration of the management server 108. Software components 901 to 908 shown in FIG. 9, except an image forming apparatus management program 905, are basically the same as the software components of the firmware distribution server 101 shown in FIG. 7 respectively, and therefore they will not be described.

Here, the image forming apparatus management program 905 is software for managing the image forming apparatuses in the intranet (LAN) 110.

Figure 10:
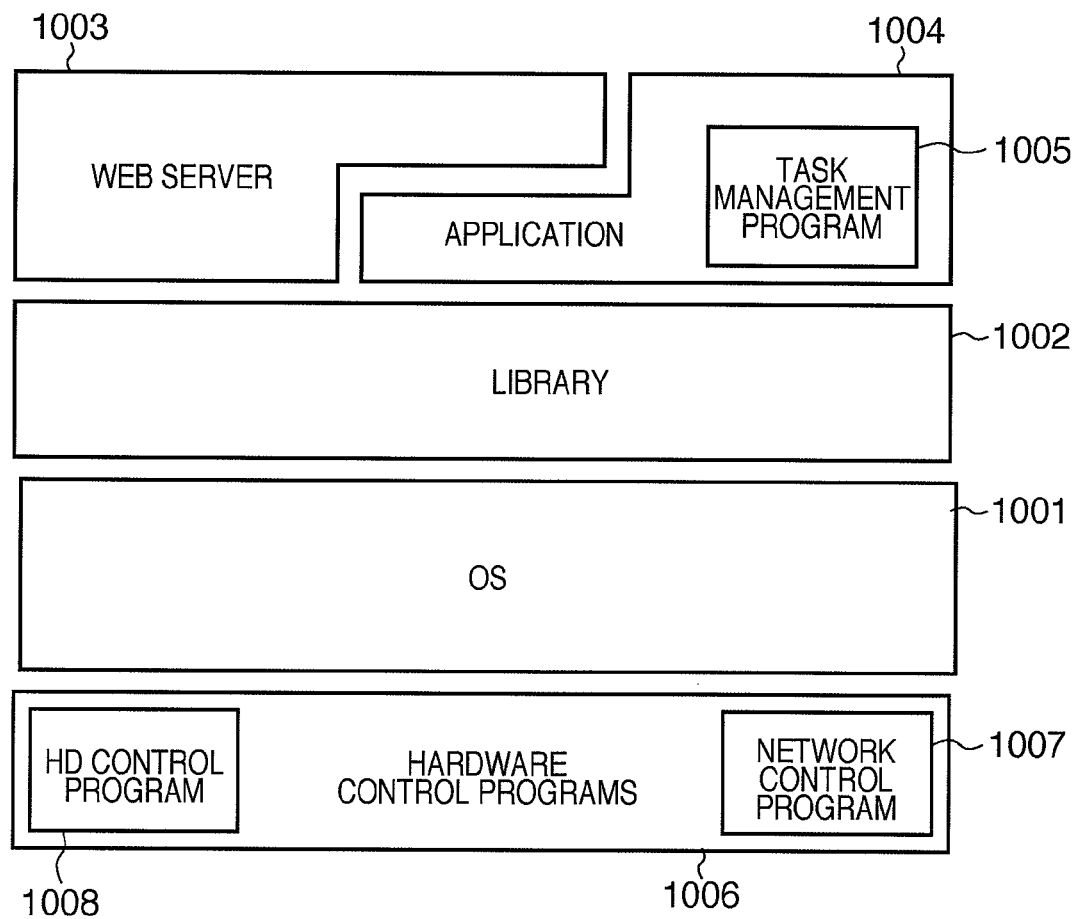
FIG. 10 is a diagram showing an exemplary software configuration of image forming apparatuses 103 to 107.

FIG. 10 is a diagram showing an exemplary software configuration of the image forming apparatuses 103 to 107. Software components 1001 to 1008 shown in FIG. 10, except a task management program 1005, are basically the same as the software components of the firmware distribution server 101 shown in FIG. 7 respectively, and therefore they will not be described.

Here, the task management program 1005 is software for managing tasks performed in the image forming apparatuses.

Figure 11:
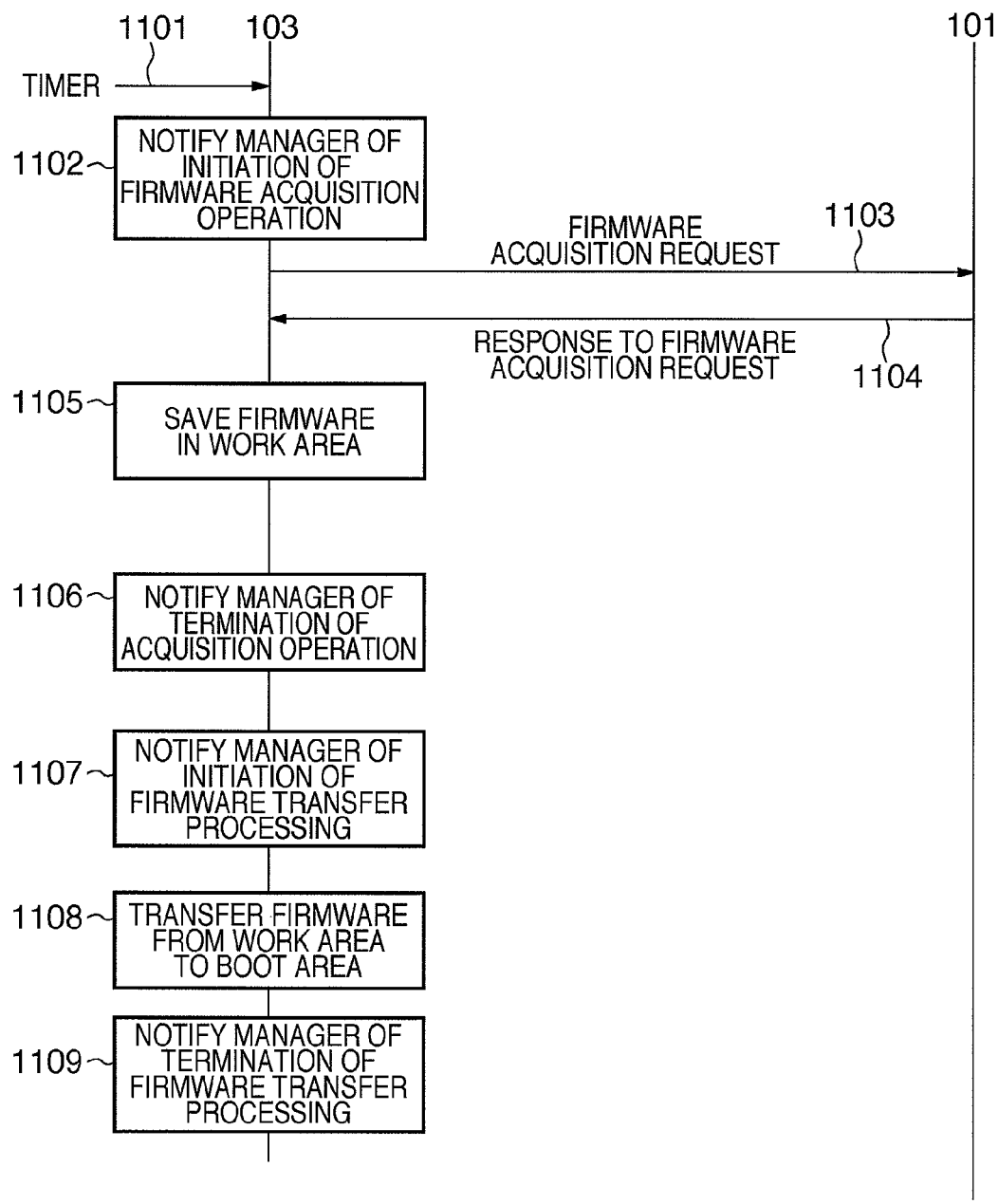
FIG. 11 is a diagram showing an exemplary sequence where an application 1004 directly communicates with the firmware distribution server 101.
Figure 12:
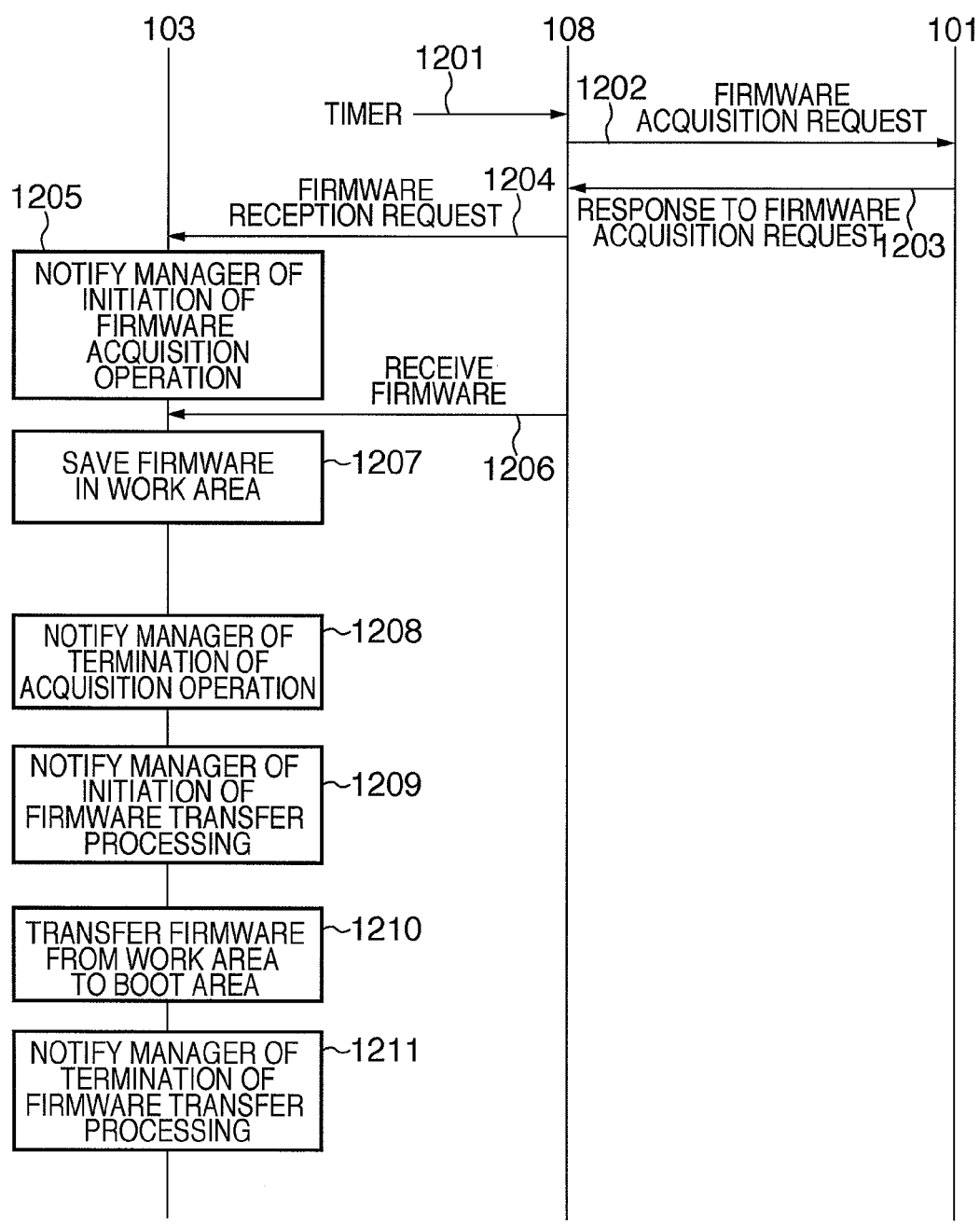
FIG. 12 is a diagram showing an exemplary sequence where the application 1004 communicates with the firmware distribution server 101 via the management server 108.

In the above-described configurations, a firmware update operation performed in an image forming apparatus will be described with reference to sequence diagrams of FIGS. 11 and 12. In FIGS. 11 and 12, a "manager" is equivalent to the task management program 1005. It is assumed that the firmware update operation is controlled by the application 1004.

First, with reference to FIG. 11, the case will be described where the application 1004 of the image forming apparatus directly communicates with the firmware distribution server 101 connected to the Internet 111.

FIG. 11 is a diagram showing an exemplary sequence where the application 1004 directly communicates with the firmware distribution server 101. It is to be understood that although this example assumes the image forming apparatus as the central multifunction peripheral 103, it also applies to any of the image forming apparatuses 104 to 107. Also, the firmware update operation to be described in this example is a scheduled operation not explicitly indicated by the user.

When a notification of the arrival (1101) of a firmware update time is provided from a timer, a firmware update program included in the application 1004 of the central multifunction peripheral 103 is executed. The firmware update program notifies the task management program 1005 of the initiation of a firmware acquisition operation (1102). At this point, the task management program 1005 transmits a firmware acquisition request (1103) to the firmware distribution server 101 via the network I/F unit 606. This firmware acquisition request (1103) includes information identifying the image forming apparatus.

The firmware distribution server 101 receives the firmware acquisition request (1103) over the Internet 111 via the network I/F unit 204 and saves it in the RAM 203. The firmware information management program 705 of the firmware distribution server 101 reads from the HDD 208 a firmware item that matches the firmware acquisition request stored in the RAM 203 including the information identifying the image forming apparatus. The firmware item is transmitted to the firmware update program via the network I/F unit 204 as a response (1104) to the request.

The firmware update program stores the firmware item received via the network I/F unit 606 in a work area in the HDD 611 (1105). Thereafter, when the processing of receiving and storing the firmware item is finished, the firmware update program notifies the task management program 1005 of the termination of the firmware acquisition operation (1106).

Next, the firmware update program notifies the task management program 1005 of the initiation of processing of transferring the firmware item from the work area in the HDD 611 to a proper area (1107). The firmware item in the work area in the HDD 611 is transferred to the proper area, that is, to a firmware storage area that is also in the HDD 611 and loaded at boot-up (1108).

When the transfer of the firmware item is completed, the firmware update program notifies the task management program 1005 of the completion of the transfer (1109).

Next, with reference to FIG. 12, the case will be described where the application 1004 of the image forming apparatus communicates with the firmware distribution server 101 via the management server 108.

FIG. 12 is a diagram showing an exemplary sequence where the application 1004 communicates with the firmware distribution server 101 via the management server 108. Again, it is to be understood that although this example assumes the image forming apparatus as the central multifunction peripheral 103, it also applies to any of the image forming apparatuses 104 to 107. Also, the firmware update operation to be described in this example is a scheduled operation not explicitly indicated by the user.

When a notification of the arrival (1201) of a firmware update time is provided from a timer, firmware acquisition processing by the image forming apparatus management program 905 of the management server 108 is performed. A firmware acquisition request (1202) is transmitted to the firmware distribution server 101 along with information about an image forming apparatus which is managed by the management server 108 and for which the firmware is to be updated. In this example, information about the central multifunction peripheral 103 is transmitted.

The firmware distribution server 101 receives the firmware acquisition request (1202) over the Internet 111 via the network I/F unit 204 and saves it in the RAM 203. The firmware information management program 705 of the firmware distribution server 101 reads from the HDD 208 a firmware item that matches the firmware acquisition request stored in the RAM 203 including the information identifying the image forming apparatus. The firmware item is transmitted to the management server 108 via the network I/F unit 204 as a response (1203) to the request.

Upon receiving the firmware item from the firmware distribution server 101, the management server 108 saves the firmware item in the RAM 403 or the HDD 408. The management server 108 transmits a firmware reception request (1204) to the central multifunction peripheral 103 via the network I/F unit 404.

When the central multifunction peripheral 103 receives the firmware reception request (1204) from the management server 108, the firmware update program notifies the task management program 1005 of the initiation of a firmware acquisition operation (1205). The central multifunction peripheral 103 receives the firmware item via the network I/F unit 606 (1206) and stores it in the work area in the HDD 611 (1207). Thereafter, when the reception and storage of the firmware item is finished, the firmware update program notifies the task management program 1005 of the termination of the firmware acquisition (1208).

Next, the firmware update program notifies the task management program 1005 of the initiation of processing of transferring the firmware item from the work area in the HDD 611 to a proper area (1209). The firmware item in the work area in the HDD 611 is transferred to the proper area, that is, to a firmware storage area that is also in the HDD 611 and loaded at boot-up (1210).

When the transfer of the firmware item is completed, the firmware update program notifies the task management program 1005 of the completion of the transfer (1211).

Although in FIGS. 11 and 12 the firmware update program included in the application 1004 notifies the task management program 1005 of what processing is performed, the notification is not necessarily required. A procedure of the task management program 1005 will be further described later.

Figure 13:
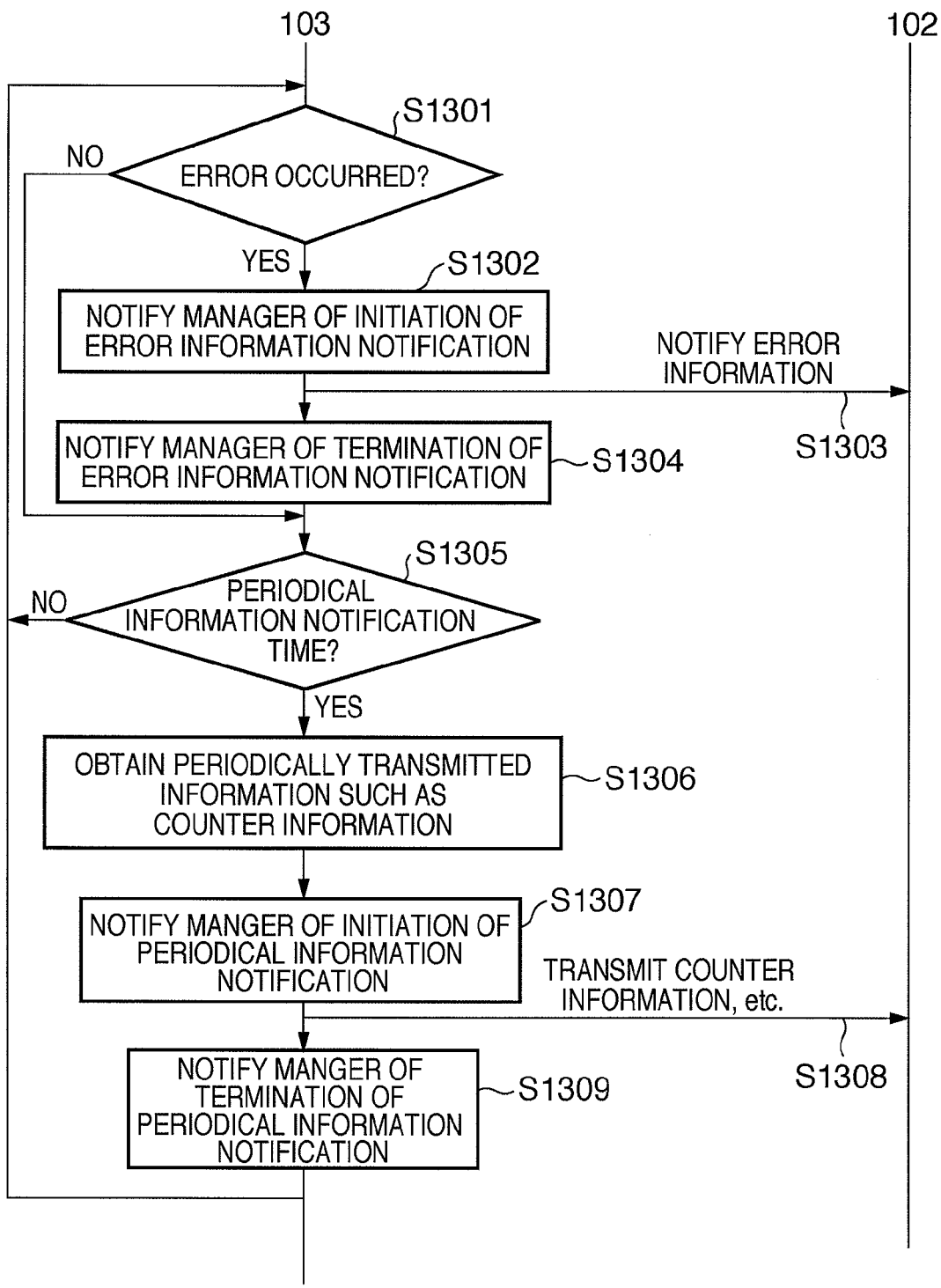
FIG. 13 is a diagram showing an exemplary sequence where the application 1004 provides information to the remote monitoring server 102.

Now, with reference to a sequence diagram of FIG. 13, description will be given of the operation of providing a notification of error information and counter information (the number of printed sheets, the number of times a certain part was used, etc.) from an image forming apparatus to the remote monitoring server 102. In FIG. 13, a "manager" is equivalent to the task management program 1005. It is to be understood that although this example assumes the image forming apparatus as the central multifunction peripheral 103, it also applies to any of the image forming apparatuses 104 to 107. It is also assumed that collecting the information to be provided to the remote monitoring server 102 and providing the information are controlled by the application 1004.

FIG. 13 is a diagram showing an exemplary sequence where the application 1004 provides the information to the remote monitoring server 102. The operation of providing the information about the image forming apparatus to the remote monitoring server 102 will be described as a scheduled operation not explicitly indicated by the user.

When the central multifunction peripheral 103 detects the occurrence of an error during operation (YES in 1301), it notifies the task management program 1005 of the initiation of error information notification processing (1302). An error information notification (1303) about the error that has occurred is transmitted to the remote monitoring server 102 over the Internet 111 via the network I/F unit 606 along with information identifying the image forming apparatus.

When the notification processing is finished, the task management program 1005 is notified of the termination of the error information notification processing (1304). It is determined whether or not a periodical information notification time has arrived (1305). The periodical information notification time is stored in the ROM 609 or the HDD 611 beforehand. Here, it is determined whether or not the periodical information notification time has arrived by reading the periodical information notification time and determining whether it matches the current time.

If it is determined that the current time matches the periodical information notification time (YES in 1305), periodically transmitted data such as the counter data is collected and stored in the RAM 610 (1306). The task management program 1005 is notified of the initiation of periodical information notification processing (1307).

The information such as the counter information stored in the RAM 610 is transmitted to the remote monitoring server 102 via the network I/F unit 606 (1308). Thereafter, when the transmission is finished (1308), the task management program 1005 is notified of the termination of the periodical information notification processing (1309).

Although the application 1004 notifies the task management program 1005 of its own state before and after the transmission processing, the notification is not limited to this timing. Rather, the notification may be provided before and after collecting the periodically transmitted data.

For task management, providing the notifications from the application 1004 to the task management program 1005 is not necessarily required. In addition, the timing of providing the notifications from the application 1004 to the task management program 1005, that is, for which processing the initiation and termination notifications are provided, is not limited to the above-described example. The notifications may be provided for processing that requires notifying the user that the processing is ongoing, or for processing that does not permit the apparatus to be shut down during the execution of the processing.

Now, detailed operation of the task management program 1005 included in the application 1004 of the image forming apparatus will be described with reference to FIGS. 14 to 20.

FIG. 14 is a diagram showing an exemplary configuration of a table that maintains data representing characteristics of tasks. The table 1401 maintains data representing the task characteristics to be referred to when the task management program 1005 receives a shutdown instruction and displays task states. The table 1401 is stored in the ROM 609 or the HDD 611 beforehand. The task management program 1005 reads the data from the ROM 609 or the HDD 611 into the RAM 610 and refers to the data.

Reference numeral 1402 denotes information identifying the type of each task. Reference numeral 1403 denotes the processing state of the task. For user-input jobs including print, fax transmission, and fax reception, the processing states include "ongoing" and "waiting." For firmware update, the processing states include states such as "obtaining the update image," "developing the update image," and "replacing the firmware." For a monitoring program that controls data transmission to the remote monitoring server 102, the processing states include states such as "transmitting error information," "obtaining periodically transmitted information," and "transmitting periodically transmitted information."

Reference numeral 1404 indicates whether or not cancellation of the processing is permitted if the task 1402 is in the processing state indicated in 1403, and it holds "permitted," "prohibited," or "unnecessary." If cancellation is unnecessary, the user need not perform an operation of canceling the task in order to safely shut down the image forming apparatus. Tasks for which cancellation is unnecessary and their task processing states will be displayed as merely information about the state of the image forming apparatus.

Reference numeral 1405 indicates whether or not a setting such that, for example, the task is saved when the processing of the task is canceled, is possible if the task 1402 is in the processing state indicated in 1403. Reference numeral 1406 denotes data that is effective if the setting change possibility 1405 indicates "POSSIBLE."

That is, the data 1406 indicates that a setting is possible such that the task is saved in a BOX (i.e., a job recording area in the HDD 611) before shutdown if the task type 1402 is a print job and the processing state 1403 is "waiting."

For the task of fax transmission at a specified time, the data 1406 indicates that the fax transmission time can be changed.

FIG. 15 is a diagram showing a task state management table that the task management program 1005 maintains in the RAM 610. This table is updated in response to a notification from the application 1004. Further, this table is updated in response to the task management program 1005 obtaining the state of each part of the apparatus detected by the sensor 607 and the spool state.

In FIG. 15, reference numeral 1502 denotes the type of each task. Reference numeral 1503 denotes the task number that uniquely identifies the task. Reference numeral 1504 denotes the processing state of the task. Reference numeral 1505 denotes accompanying information about the task. As an example, for a print job, the accompanying information 1505 holds the name of a user who has issued the print job, and for fax transmission at a specified time, the accompanying information 1505 holds the specified time.

Figure 16:
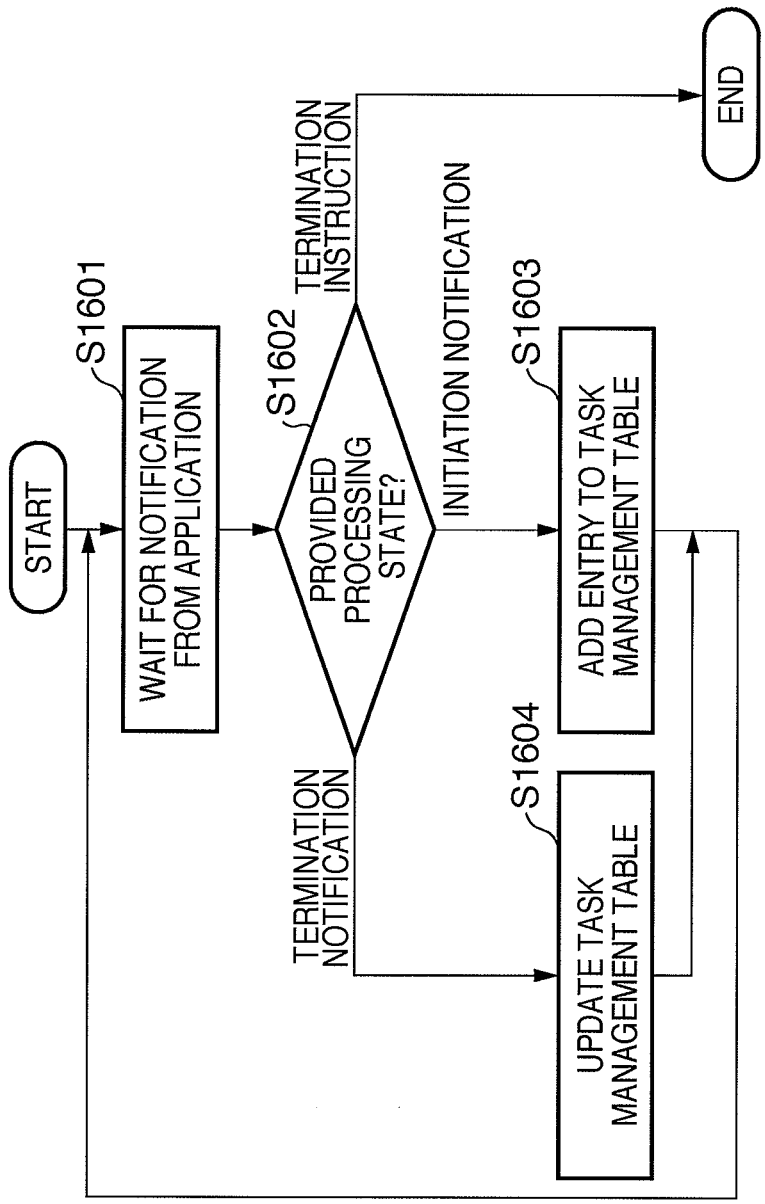
FIG. 16 is a flowchart showing the operation of updating the management table that manages task states.

FIG. 16 is a flowchart showing the operation of updating the management table that manages the task states. This flowchart represents operations that are part of the task management program 1005 executed by the CPU 608.

A state notification from the application 1004 is waited for (S1601). Data provided here from the application 1004 includes the task type, the task number, and the processing state. The data transmission from the application 1004 to the task management program 1005 is performed via the system bus 615.

The provided information is analyzed, that is, the task state, the task number, and the processing state are saved in the RAM 610 and identified (S1602). If it is determined that the provided processing state is an "initiation notification," the task management program 1005 adds an entry for the provided task type, task number, and processing state to the task management table 1501 (S1603). If it is determined that the provided state is a "termination notification," the task management program 1005 updates the task management table 1501 (S1604).

If a "termination instruction" is provided as an interrupt not from the application 1004 but from the OS 1001, the task management program 1005 is immediately terminated.

If a notification about the above-described firmware update program is received in S1601, the following task type and processing state are added.

The task type is "firmware update," and the processing state is "replacing the firmware." In one configuration, a notification of the remaining processing time may also be provided as the accompanying information about the processing state.

If a notification about the above-described monitoring program is received in S1601, the following task type and processing state are added. The task type is "monitoring," and the processing state is "transmitting error information."

The above-described task number is assigned by the OS 1001 to each of tasks arising and passing off in the image forming apparatus, so that it is not a fixed value.

When the processing of adding the entry to the task management table 1501 is finished, the process returns to S1601 to wait for a notification from the application 1004. Thereafter, when a "termination notification" is provided from the application 1004 in S1602, the task management table 1501 is updated (S1604). Specifically, the task management program 1005 deletes from the task management table 1501 the entry holding the task number that matches the task number provided in S1601.

When the processing of deleting the entry from the task management table 1501 is finished, the process returns to S1601 to wait for a notification from the application 1004.

The task management program 1005 further obtains the state of each part of the apparatus detected by the sensor 607 and the spool state, and updates the task management table

1501. The task management program 1005 may perform this processing periodically or after a shutdown instruction is provided.

The task management program also obtains information as to whether or not devices are linked from the management server 108 or the image forming apparatuses 103 to 107.

Figure 17:
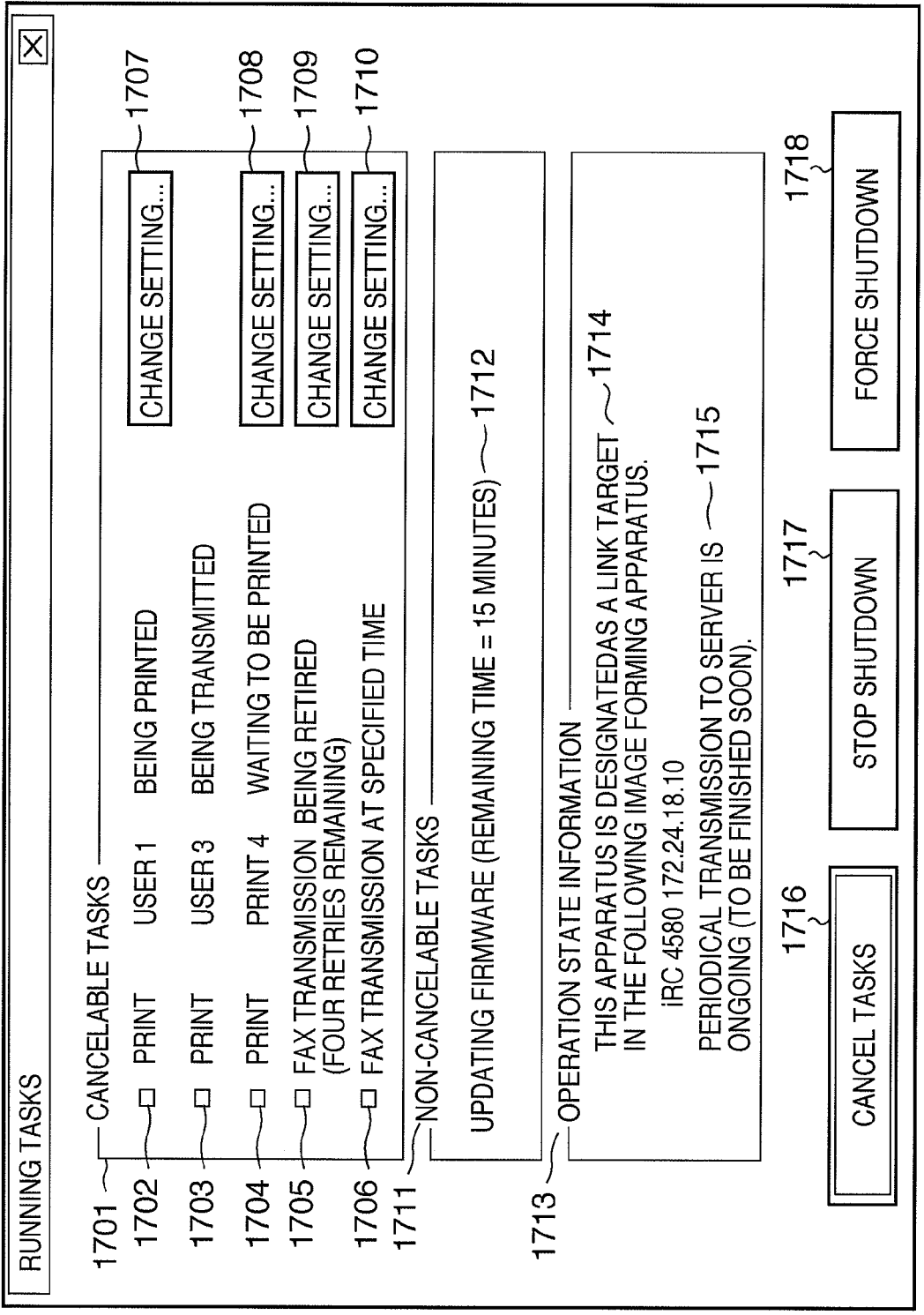
FIG. 17 is a diagram showing an exemplary task list display according to the characteristics of tasks.

FIG. 17 is a diagram showing an exemplary task list display according to the characteristics of tasks. Specifically, it is an exemplary task list displayed on the display unit 613 when the user provides a shutdown instruction with the operation unit 612. Reference numeral 1701 denotes a cancelable task list. Checkboxes 1702 to 1706 are used to designate tasks to be canceled. Reference numerals 1707 to 1710 denote Change Setting buttons. Pressing one of the Change Setting buttons 1707, 1708, and 1709 causes a destination BOX designation dialog box shown in FIG. 18 to be displayed. FIG. 18 is a diagram showing an exemplary destination BOX designation dialog box.

FIG. 17 shows an example in which cancelable tasks and non-cancelable tasks performed in the image forming apparatus are distinguishably displayed based on their types and processing states. The types of the tasks are the information described in 1402 of FIG. 14, for example. The processing states of the tasks are the information described in 1403 of FIG. 14, for example. Shown in 1404 is the determination result. That is, it is the result of determining whether or not to cancel each task according to its type and processing state. Based on this information, the display as shown in FIG. 17 is provided.

Pressing the Change Setting button 1710 causes a time setting changing dialog box shown in FIG. 19 to be displayed. FIG. 19 is a diagram showing an exemplary time setting changing dialog box.

Returning to FIG. 17, reference numeral 1711 denotes a non-cancelable task list. The cancelable task list 1701 represents a display of the user interface elements in the case where the administrator provides a shutdown instruction with the operation unit 612.

In the case where a general user who is not the administrator, for example a user 1, provides a shutdown instruction with the operation unit 612, the checkbox 1702 is displayed but the checkboxes 1703 to 1706 are not displayed. Further, the Change Setting button 1707 is displayed but the Change Setting buttons 1708 to 1710 are not displayed.

Reference numeral 1713 denotes an operation state information list. The states of tasks and so on displayed in this list do not affect the shutdown processing. That is, it is information about tasks which the user need not cancel or for which the user need not change settings, in order to continue the shutdown processing.

Reference numeral 1716 denotes a Cancel Tasks button. If, for example, the checkbox 1703 has been selected, pressing the Cancel Tasks 1716 causes the fax transmission job of a user 3 to be canceled.

Reference numeral 1717 denotes a button for instructing to stop the shutdown. Pressing the Stop Shutdown 1717 causes this dialog box to disappear, and the display unit 613 returns to the state before the user provides the shutdown instruction with the operation unit 612.

Reference numeral 1718 denotes a button for instructing to force the shutdown. Forcing the shutdown involves terminating the tasks in the cancelable task list 1701, the tasks in the non-cancelable task list 1711, and all tasks running in the image forming apparatus, and then shutting down the apparatus.

The Force Shutdown 1718 is displayed when the administrator provides a shutdown instruction with the operation unit 612 but not displayed when a general user provides a shutdown instruction.

Now, the destination BOX designation dialog box shown in FIG. 18 will be described. This dialog box is used to designate which of nonvolatile areas called BOXs is used to save a print job so that the print job can be printed after the next power-on of the image forming apparatus.

Reference numeral 1801 denotes a pull-down menu, in which a BOX name list is displayed. From the pull-down menu, the user selects the name of a destination BOX for saving the job.

Reference numeral 1802 denotes a button for giving the instruction to save the job in the selected BOX. Pressing the OK 1802 causes the job to be saved in the BOX and deleted from the cancelable task list 1701. That is, if the OK 1802 is pressed after the Change Setting button 1707 is pressed, the dialog shown in FIG. 18 disappears and the dialog shown in FIG. 17 is displayed. The print task of the user 1 being printed is now deleted from the cancelable task list 1701 in the displayed dialog.

Reference numeral 1803 shown in FIG. 18 denotes a button for providing an instruction to cancel the operation of saving in the BOX. If the Cancel 1803 is selected, the dialog shown in FIG. 18 disappears and the dialog shown in FIG. 17 is displayed. The display of the cancelable task list 1701 remains the same as before the Change Setting button 1707 was pressed.

Now, the time setting changing dialog box shown in FIG. 19 will be described. This box is used to designate a timer change for what is called a "timer job," such as fax transmission at a specified time. Reference numeral 1901 denotes a current timer setting. Reference numeral 1902 denotes an area for setting a new set value. Reference numeral 1903 denotes a button for providing an instruction to replace the timer setting with the value set in the area 1902. Pressing an OK 1903 causes the display to return to the dialog shown in FIG. 17.

Reference numeral 1904 denotes a button for canceling the operation of changing the timer setting. Pressing the Cancel 1904 causes the display to return to the dialog shown in FIG. 17.

Whichever of the OK 1903 and the Cancel 1904 is pressed, the display of the cancelable task list 1701 remains the same.

The above-described fax transmission job at a specified time does not require the user to change its setting or cancel the job provided that the image forming apparatus is to be powered on by the set time. The checkbox 1706 is displayed only if the set time is within a preset minutes or hours from the current time.

Now, a procedure of the task management program 1005 for providing the above-described task list display will be described with reference to FIG. 20.

Figure 20:
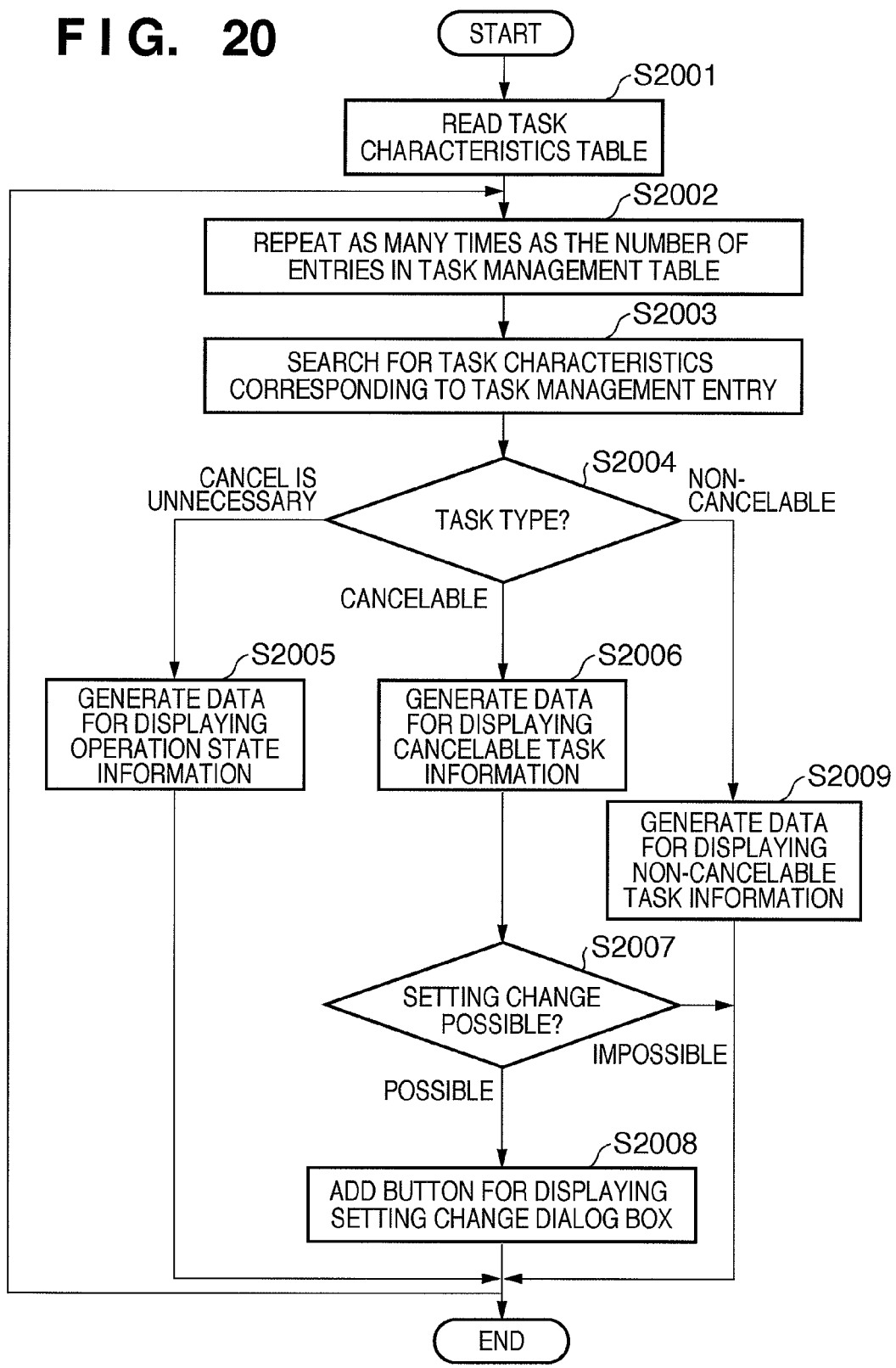
FIG. 20 is a flowchart showing a procedure of providing the task list display performed by the task management program 1005.

FIG. 20 is a flowchart showing the procedure of providing the task list display performed by the task management program 1005. Upon detecting a shutdown instruction, the task management program 1005 starts this processing.

The table 1401 stored in the ROM 609 or the HDD 611 is read and placed in the RAM 610 (S2001). The number of entries in the task management table 1501 and the number of processed entries are checked to see whether the processing has been done for all the entries in the task management table 1501 (S2002).

The task characteristics (the task type 1402 and the processing state 1403) that match the entry being processed (the task type 1502 and the processing state 1504) in the task management table 1501 are searched for (S2003). It is determined whether or not the task type 1402 identified as matching is cancelable with reference to the cancel 1404 (S2004).

If it is determined that the cancellation is unnecessary, data for displaying the operation state information to be displayed in the operation state information list 1713 shown in FIG. 17 is generated (S2005).

If it is determined that the task is cancelable, data for displaying the cancelable task information to be displayed in the cancelable task list 1701 shown in FIG. 17 is generated (S2006). Specifically, the above-described checkboxes, task types, user names (if any), and processing states are generated. The setting change possibility 1405 for the matching task is identified (S2007). If "POSSIBLE," the Change Setting button and data for displaying the setting change dialog box are added (S2008).

If it is determined that the task is non-cancelable in S2004 above, data for displaying the non-cancelable task information to be displayed in the non-cancelable task list 1711 shown in FIG. 17 is generated (S2009).

Thus, as described above, the task management program 1005 refers to the two tables, the table 1401 and the task management table 1501, to generate and display the dialog box displaying the running tasks.

When the Change Setting buttons 1707 to 1710 are pressed, the dialog box to be displayed is controlled according to the setting change method 1406 defined for an entry in the table 1401 that matches to the corresponding entry in the task management table 1501.

According to the above-described embodiment, the following advantages are achieved by having both the task state managing function and the task characteristics information.

The user of the apparatus can know the reason why the apparatus is not immediately shut down after the user has provided a shutdown instruction, and the user can also cancel tasks.

For a non-cancelable task, the user can know the processing state such as the time required for the task to be finished and readily know the situation up to when the image forming apparatus is shut down. Then, the user can safely stop the image forming apparatus.

Further, the user can not only cancel tasks but also specify that the tasks be resumed after the next power-on of the image forming apparatus, thereby improving the usability.

The present invention may be applied to a system composed of a plurality of devices (for example, a host computer, interfacing device, reader, printer, etc.), or to an apparatus implemented as a single device (for example, a copier, facsimile device, etc.).

It is to be understood that the objects of the present invention may be achieved in such a manner that a recording medium having recorded thereon a program code of software implementing the functions of the above-described embodiment is supplied to the system or apparatus, and a computer (a CPU or MPU) of the system or apparatus reads out and executes the program code stored in the recording medium.

In this case, the program code itself read out from the computer-readable recording medium implements the functions of the above-described embodiment, so that the recording medium having stored thereon the program code constitutes the present invention.

The recording medium for supplying the program code may be a flexible disk, hard disk, optical disk, magneto-optical disk, CD-ROM, CD-R, magnetic tape, nonvolatile memory card, or ROM, for example.

It is to be understood that, besides the case where the computer executes the read-out program code to implement the functions of the above-described embodiment, the case is also included where an OS (operating system) or the like running on the computer performs part or all of actual processing under instructions of the program code to implement the functions of the above-described embodiment.

Further, it is to be understood that the case is also included where the program code read out from the recording medium is written to memory provided in a function extension board inserted into the computer or in a function extension unit connected to the computer, and then a CPU or the like provided in the function extension board or function extension unit performs part or all of actual processing under instructions of the program code to implement the functions of the above-described embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-021650, filed Jan. 31, 2008, which is hereby incorporated by reference herein in its entirety.

What is claimed is:

1. An image forming apparatus comprising:
   a holding unit that holds a table for managing a characteristic according to a shutdown of the image forming apparatus for each kind of task;
   a display unit that, when an instruction to shut down the image forming apparatus is provided, distinguishably displays cancelable tasks and tasks which cancellation is prohibited based on a type and a processing state of each of tasks in the image forming apparatus with reference to the table;
   a setting change unit that performs a setting change for each setting of the cancelable tasks displayed by the display unit in order to resume after the next power-on of the image forming apparatus, wherein the setting change unit designates, as the setting change, (i) a nonvolatile storage area of the image forming apparatus in which data corresponding to the cancelable task is stored or (ii) time information of the cancelable task to be resumed;
   a cancellation unit that cancels the cancelable tasks; and
   a processing unit that controls the image forming apparatus so as to perform processing for the shutdown in a case where either the setting of the cancelable tasks is changed or the cancelable tasks are cancelled by the cancellation unit and processing of the tasks which cancellation is prohibited is terminated,
   wherein the display unit, when the instruction to shut down the image forming apparatus is provided, further distinguishably displays a task that does not need to be canceled as operation state information based on the type and processing state of each task in the image forming apparatus with reference to the table.

2. The apparatus according to claim 1, wherein the cancelable tasks comprise at least any of tasks of print waiting to be processed, print being processed, fax transmission waiting to be processed, fax transmission being processed, fax reception waiting to be processed, an update image being obtained, and an update image being developed.

3. The apparatus according to claim 1, wherein the tasks which the cancellation is prohibited comprise at least any of tasks of fax reception being processed and firmware being replaced.

4. A processing method for an image forming apparatus, comprising:

holding a table for managing a characteristic according to a shutdown of the image forming apparatus for each kind of task;

when an instruction to shut down the image forming apparatus is provided, distinguishably displaying cancelable tasks and tasks which cancellation is prohibited based on a type and a processing state of each of tasks in the image forming apparatus in reference to the table;

performing a setting change for each setting of the displayed cancelable tasks in order to resume after the next power-on of the image forming apparatus, wherein the setting change indicates (i) a designation of a nonvolatile storage area of the image forming apparatus into which data corresponding to the cancelable task is stored or (ii) a designation of time information of the cancelable task to be resumed;

cancelling the cancelable tasks; and controlling the image forming apparatus so as to perform processing for the shutdown in a case where either the setting of the cancelable tasks is changed or the cancelable tasks are cancelled and processing of the tasks which cancellation is prohibited is terminated, wherein, when the instruction to shut down the image forming apparatus is provided, a task that does not need to be canceled is further distinguishably displayed as operation state information based on the type and processing state of each task in the image forming apparatus with reference to the table.

5. A non-transitory computer-readable recording medium having recorded thereon a program for causing a computer to execute the processing method for an image forming apparatus according to claim 4.

* * * * *